(12) United States Patent
Park et al.

(10) Patent No.: US 9,208,226 B2
(45) Date of Patent: Dec. 8, 2015

(54) APPARATUS AND METHOD FOR GENERATING EVIDENCE VIDEO

(71) Applicant: ELECTRONICS AND TELECOMMUNICATIONS RESEARCH INSTITUTE, Daejon (KR)

(72) Inventors: Su-Wan Park, Daejeon (KR); Kyung-Soo Lim, Daejeon (KR); Geon-Woo Kim, Daejeon (KR); Min-Ho Han, Daejeon (KR); Su-Gil Choi, Daejeon (KR); Chi-Yoon Jeong, Daejeon (KR); Moo-Seop Kim, Daejeon (KR); Jong-Wook Han, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 347 days.

(21) Appl. No.: 13/843,911

(22) Filed: Mar. 15, 2013

(65) Prior Publication Data
US 2014/0214885 A1 Jul. 31, 2014

(30) Foreign Application Priority Data
Jan. 31, 2013 (KR) .................. 10-2013-0011476

(51) Int. Cl.
*G06F 7/00* (2006.01)
*G06F 17/30* (2006.01)

(52) U.S. Cl.
CPC ................. *G06F 17/30784* (2013.01)

(58) Field of Classification Search
CPC .............. G08B 13/19608; G08B 13/19606; G08B 13/19615; G08B 13/19673; G08B 13/19613; G08B 13/19682; G08B 13/19693; G08B 13/19645
USPC ........................................... 707/769
See application file for complete search history.

(56) References Cited

U.S. PATENT DOCUMENTS

| | | | |
|---|---|---|---|
| 2005/0162515 A1* | 7/2005 | Venetianer et al. | 348/143 |
| 2006/0077254 A1* | 4/2006 | Shu et al. | 348/143 |
| 2006/0078047 A1* | 4/2006 | Shu et al. | 375/240.01 |
| 2007/0071285 A1* | 3/2007 | Kontsevich | 382/103 |
| 2007/0071323 A1* | 3/2007 | Kontsevich et al. | 382/190 |
| 2007/0183661 A1* | 8/2007 | El-Maleh et al. | 382/173 |
| 2007/0183663 A1* | 8/2007 | Wang et al. | 382/173 |
| 2008/0074494 A1* | 3/2008 | Nemethy et al. | 348/143 |
| 2008/0106599 A1* | 5/2008 | Liu et al. | 348/143 |
| 2010/0329547 A1* | 12/2010 | Cavet | 382/164 |

(Continued)

FOREIGN PATENT DOCUMENTS

KR 10-2011-0035662 A 4/2011

*Primary Examiner* — Binh V Ho (57) ABSTRACT

Disclosed herein are an apparatus and method for generating evidence video. The apparatus includes a video object indexing unit, a video object search unit, and an evidence video generation unit. The video object indexing unit recognizes an object by storing and analyzing videos received from multiple surveillance cameras, extracts the features of the recognized object, and then generates object metadata. The video object search unit compares received search conditions with the object metadata, and then outputs search results, including the feature information of at least one object, which corresponds to the search conditions. The evidence video generation unit generates an evidence video by aggregating only videos including a specific object selected from the search results.

18 Claims, 4 Drawing Sheets

(56) References Cited

U.S. PATENT DOCUMENTS

| | | | |
|---|---|---|---|
| 2011/0087559 A1* | 4/2011 | Paul et al. | 705/26.81 |
| 2011/0122247 A1* | 5/2011 | Kim et al. | 348/143 |
| 2011/0128382 A1* | 6/2011 | Pennington et al. | 348/153 |
| 2011/0205359 A1* | 8/2011 | Lee et al. | 348/143 |
| 2011/0211070 A1* | 9/2011 | Shu et al. | 348/143 |
| 2013/0002863 A1* | 1/2013 | Jia et al. | 348/143 |
| 2013/0029866 A1* | 1/2013 | Sun et al. | 506/9 |
| 2014/0009608 A1* | 1/2014 | Heier | 348/143 |
| 2014/0050455 A1* | 2/2014 | Ni et al. | 386/224 |
| 2014/0071290 A1* | 3/2014 | Collen et al. | 348/159 |

* cited by examiner

APPARATUS AND METHOD FOR GENERATING EVIDENCE VIDEO

CROSS REFERENCE TO RELATED APPLICATION

This application claims the benefit of Korean Patent Application No. 10-2013-0011476, filed on Jan. 31, 2013, which is hereby incorporated by reference in its entirety into this application.

BACKGROUND OF THE INVENTION

1. Technical Field

The present invention relates generally to an apparatus and method for generating evidence video and, more particularly, to an apparatus and method for generating evidence video using intelligent video search technology based on multiple surveillance cameras.

2. Description of the Related Art

Surveillance systems using conventional video security technology require a long time and, thus, cannot guarantee the security of a surveillance target object because they analyze collected related images and then take measures after an event has occurred. Additionally, they cannot efficiently solve and deal with an event because it is difficult to accurately analyze correlations between collected images.

Furthermore, the surveillance systems using conventional video security technology considerably increase cost and considerably decrease efficiency and accuracy because they analyze correlations between separately collected images using a non-automated method and then make inferences. Additionally, they cannot rapidly take action because it takes a long time to check the administrators of surrounding closed circuit televisions (CCTVs) and to acquire and analyze video material when an event occurs in a specific area. Additionally, it takes a long time to generate, analyze and utilize video data that may be used as an evidence for an event, and such video data has little value as an evidence because it may be modified and deleted.

Korean Patent No. 10-1062225 entitled "Intelligent Video Search Method and System using Surveillance Camera" discloses video search technology that performs pedestrian tracking and characteristic extraction and is based on a pedestrian's characteristics. That is, Korean Patent No. 10-1062225 proposes technology that can support the intelligent searches of the videos of surveillance cameras, extract the characteristics of multiple pedestrians from videos input by the surveillance cameras, and search for a desired pedestrian based on the extracted characteristics of the multiple pedestrians. For this purpose, Korean Patent No. 10-1062225 presents an intelligent video search system that includes a plurality of surveillance cameras configured to capture videos of a surveillance target area, a video processing server configured to detect a region of interest (ROI) for a pedestrian using difference background videos generated by processing videos captured by the plurality of surveillance cameras, to extract pedestrian characteristic information based on the ROI for the pedestrian, and to detect a video from which pedestrian characteristic information that belongs to the extracted pedestrian characteristic information and that matches search target pedestrian characteristic information has been extracted, and a user interface unit configured to enable the search target pedestrian characteristic information to be input or to enable the detected video to be displayed on a video search screen.

The technology disclosed in Korean Patent No. 10-1062225 can perform pedestrian characteristic-based video searches by reliably detecting and tracking multiple pedestrians and extracting the characteristics of each of the multiple pedestrians, in order to support the intelligent searches of surveillance camera videos.

However, Korean Patent No. 10-1062225 does not disclose a method of performing object searches based on multiple surveillance cameras while taking into consideration an installation environment, generating a forensic evidence video using search results, and providing the path of an object by analyzing search results.

SUMMARY OF THE INVENTION

Accordingly, the present invention has been made keeping in mind the above problems occurring in the prior art, and an object of the present invention is to provide an apparatus and method for generating evidence video that, upon the occurrence of an event/accident, are capable of providing the path of a specific object acquired from videos captured and stored by multiple surveillance cameras, and are capable of providing a reliable forensic evidence video formed by collecting videos including only a specific object.

In order to accomplish the above object, the present invention provides an apparatus for generating evidence video, including a video object indexing unit configured to recognize an object by storing and analyzing videos received from multiple surveillance cameras, to extract features of the recognized object, and then to generate object metadata; a video object search unit configured to compare received search conditions with the object metadata, and then to output search results, including feature information of at least one object, which corresponds to the search conditions; and an evidence video generation unit configured to generate an evidence video by aggregating only videos including a specific object selected from the search results.

The video object indexing unit may include a video input unit configured to receive the videos from the multiple surveillance cameras; a video analysis unit configured to recognize the object in each frame of the videos, and to designate a region of interest (ROI); a feature information extraction unit configured to extract feature information from the object for which the ROI has been designated; and a metadata creation unit configured to generate the object metadata used to index the object in the videos based on the extracted feature information of the object.

The video analysis unit may select a representative object frame from among frames of the videos in accordance with a preset criterion for selecting a representative object frame in order to extract the feature information of the object or to select a representative object frame that is used as a query image.

The feature information of the at least one object may include extracted object information for a non-overlapping view camera arrangement, including an object color, a moving speed and a moving direction, and additional information for an overlapping view camera arrangement, including an object ID, a shape, a texture, and a trajectory.

The video object search unit may include a query conversion unit configured to convert the received search conditions into a query; and a database search unit configured to extract object information, including similar features, by comparing object features corresponding to the search conditions converted into the query with the object metadata stored in a database, and then to output the extracted object information.

The evidence video generation unit may include an evidence video editing unit configured to generate the evidence video by extracting sections, including the specific object, from the stored videos and then aggregating the sections; a forensic evidence video generation unit configured to generate forensic data about the stored videos and the generated evidence video, and then to store the generated evidence video and the forensic data in digital evidence storage format; and a path analysis unit configured to acquire a path of the specific object among the multiple surveillance cameras by analyzing correlations between the search results, and then to output the path of the specific object.

The path analysis unit may display the path of the specific object in time order using a map on which environments and locations in and on which the multiple surveillance cameras have been installed.

The forensic data about the stored videos may include a video recording time in each camera from which video sources have been collected and still images of the original videos.

The forensic data about the generated evidence video ma include a forensic data list for the stored videos, information about a system and a network where the evidence video is generated, and data which verifies integrity of the generated evidence video.

The digital evidence storage format may include forensic data in XML format, still images of original videos, and an evidence video file.

The apparatus may further include a user interface unit configured to allow the search conditions to be input into the video object search unit, to receive the search results from the video object search unit and output the search results, and to play back the evidence video received from the evidence video generation unit.

The user interface unit may include a query input unit configured to allow the search conditions to be input into the video object search unit; a search result output unit configured to output the search results received from the video object search unit; a video playback unit configured to play back the evidence video received from the evidence video generation unit and a video corresponding to object information from among the search results received from the search result output unit; and a search result filtering unit configured to select an object related to the generation of the evidence video from the search results received from the search result output unit.

In order to accomplish the above object, the present invention provides an apparatus for generating evidence video, including a plurality of surveillance cameras; a video processing server, comprising a video object indexing unit configured to recognize an object by storing and analyzing videos received from the plurality of surveillance cameras, to extract features of the recognized object, and then to generate object metadata, a video object search unit configured to compare received search conditions with the object metadata, and then to output search results, including feature information of at least one object, which corresponds to the search conditions, and an evidence video generation unit configured to generate an evidence video by aggregating only videos including a specific object selected from the search results; and a video monitoring server comprising a user interface unit configured to allow the search conditions to be input, to allow the search results to be checked, and to allow generation of the evidence video to be requested.

In order to accomplish the above object, the present invention provides a method of generating evidence video, including recognizing, by a video object indexing unit, an object by storing and analyzing videos received from multiple surveillance cameras; extracting, by the video object indexing unit, features of the recognized object, and then generating, by the video object indexing unit, object metadata; comparing, by a video object search unit, received search conditions with the object metadata, and then outputting, by the video object search unit, search results, including feature information of at least one object, which corresponds to the search conditions; and generating, by an evidence video generation unit, an evidence video by aggregating only videos including a specific object selected from the search results.

Generating the object metadata may include designating an ROI in each frame of the videos based on the recognized object; extracting feature information from the object for which the ROI has been designated; and generating the object metadata used to index the object in the videos based on the extracted feature information of the object.

The feature information of the at least one object may include extracted object information for a non-overlapping view camera arrangement, including an object color, a moving speed and a moving direction, and additional information for an overlapping view camera arrangement, including an object ID, a shape, a texture, and a trajectory.

Outputting the search results may include converting the received search conditions into a query; and extracting object information, including similar features, by comparing object features corresponding to the search conditions converted into the query with the object metadata stored in a database, and then outputting the extracted object information.

Generating the evidence video may include generating the evidence video by extracting sections, including the specific object, from the stored videos and then aggregating the sections; generating forensic data about the stored videos and the generated evidence video, and storing the generated evidence video and the forensic data in digital evidence storage format; and acquiring a path of the specific object among the multiple surveillance cameras by analyzing correlations between the search results, and then outputting the path of the specific object.

Outputting the path of the specific object may be configured to display the path of the specific object in time order using a map on which environments and locations in and on which the multiple surveillance cameras have been installed.

The method may further include allowing, by a user interface unit, the search conditions to be input; receiving, by the user interface unit, the search results, and outputting, by the user interface unit, the search results; and playing back, by the user interface unit, the evidence video.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

An apparatus and method for generating evidence video according to an embodiment of the present invention will be described with reference to the accompanying drawings. Prior to the following description of the present invention, it should be noted that the terms and words used in the specification and the claims should not be construed as being limited to ordinary meanings or dictionary definitions. Meanwhile, the embodiments described in the specification and the configurations illustrated in the drawings are merely examples and do not exhaustively present the technical spirit of the present invention. Accordingly, it should be appreciated that there may be various equivalents and modifications that can replace the examples at the time at which the present application is filed.

Figure 1:
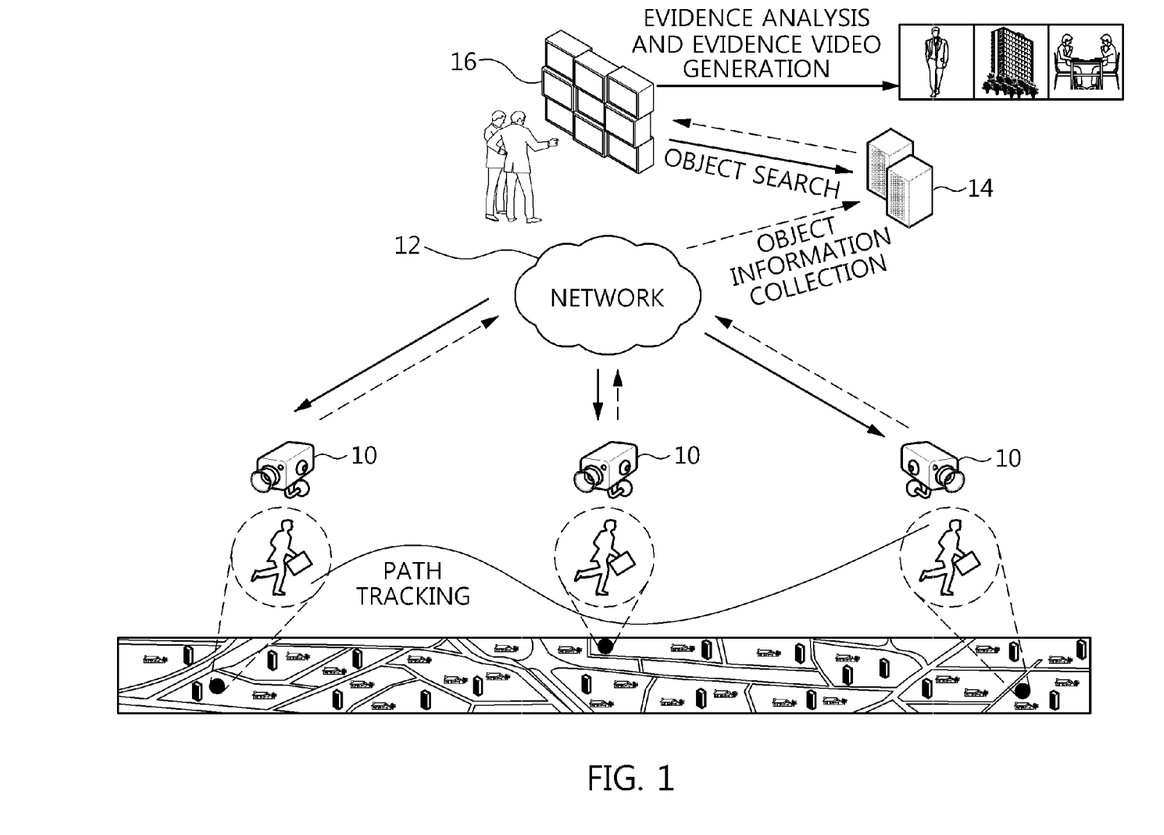
FIG. 1 is a diagram illustrating an example of an environment to which technology for generating evidence video using intelligent video search technology based on multiple surveillance cameras according to an embodiment of the present invention may be applied.

FIG. 1 is a diagram illustrating an example of an environment to which technology for generating evidence video using intelligent video search technology based on multiple surveillance cameras according to an embodiment of the present invention may be applied.

In accordance with the embodiment of the present invention, when an event/accident occurs, video information including a specific object (e.g., a suspect) is searched for in order to acquire forensic evidential material, the path of the object is detected by analyzing the correlations between images, and finally, a forensic evidence video that can be used as forensic evidential material is generated.

The system illustrated in FIG. 1 is an intelligent video surveillance system that includes a plurality of surveillance cameras 10 (also referred to as "multiple surveillance cameras"), a video processing server 14, and a video monitoring server 16.

Here, although a small-sized video surveillance system may be configured such that the video monitoring server 16 further includes video processing and storage functions, the video monitoring server 16 and the video processing server 14 are separately operated in the embodiment of the present invention. It will be apparent that the video processing server 14 may be included in the video monitoring server 16.

The plurality of surveillance cameras 10 preferably includes at least two cameras. The plurality of surveillance cameras 10 is arranged in respective surveillance areas.

The plurality of surveillance cameras (multiple surveillance cameras) 10 may be arranged in an overlapping view arrangement in which two or more cameras has a common field of view or in a non-overlapping view arrangement in which two or more cameras have no common field of view. Object feature information suitable for a camera arrangement environment is extracted, and thus the movement of an object among the multiple surveillance cameras can be tracked and searched for.

The plurality of surveillance cameras 10 communicates with the video processing server 14 and the video monitoring server 16 over a network 12.

The video processing server 14 generates object metadata that indexes one or more objects in a video, searches for an object using stored object metadata, and generates a forensic evidence video. The video processing server 14 may include a video storage server (not illustrated) that stores original video data input from the plurality of surveillance cameras 10, generated object metadata, and a representative image of an object. Meanwhile, the video recognition and object metadata generation functions that are performed by the video processing server 14 may be performed by the plurality of surveillance cameras 10 thanks to the advent of a high-performance camera.

The main purpose of the video monitoring server 16 is to monitor videos input from the plurality of surveillance cameras 10. Furthermore, the video monitoring server 16 provides a user interface that enables a user to request a specific search, to check search results, and to request the generation of an evidence video.

Figure 2:
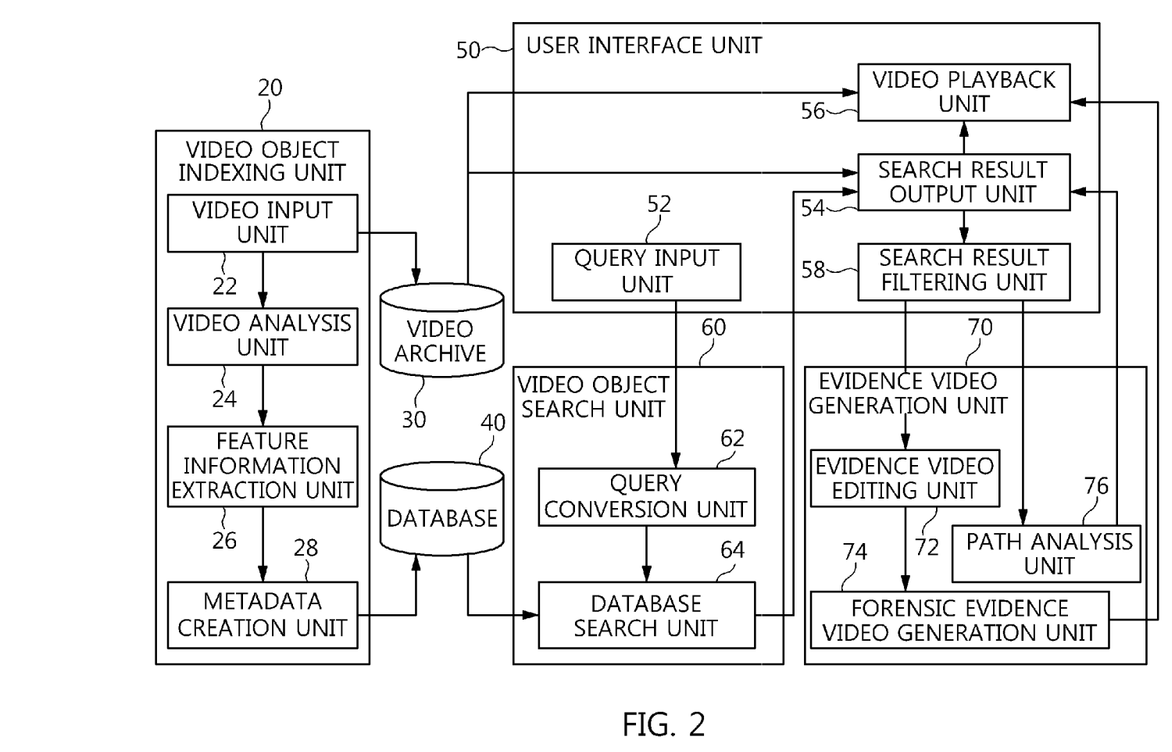
FIG. 2 is a diagram illustrating the configuration of an apparatus for generating evidence video according to an embodiment of the present invention.

FIG. 2 is a diagram illustrating the configuration of an apparatus for generating evidence video according to an embodiment of the present invention.

The apparatus for generating evidence video illustrated in FIG. 2 includes a video object indexing unit 20, a user interface unit 50, a video object search unit 60, and an evidence video generation unit 70.

The video object indexing unit 20 recognizes objects by analyzing videos input from the plurality of surveillance cameras 10 in real time, and generates object metadata by extracting the features of each object. The video object indexing unit 20 stores the generated object metadata so that it can be used for object searches. For this purpose, the video object indexing unit 20 includes a video input unit 22, a video analysis unit 24, a feature information extraction unit 26, and a metadata creation unit 28.

The video input unit 22 transfers the real-time video data input from the plurality of surveillance cameras 10 to the intelligent video recognition module (not illustrated) of the video analysis unit 24, and stores original videos in a video archive 30.

The video analysis unit 24 recognizes an object via an intelligent video recognition module (not illustrated) that performs background modeling and object tracking, and sets the region of the recognized object as an ROI. Furthermore, the video analysis unit 24 selects a frame in which the object is most clearly visible from among a plurality of frames in which the object is present, through representative frame extraction. Here, the selected frame becomes a representative frame.

The feature information extraction unit 26 extracts object feature information, which is robust regardless of variations in the environment, from the object designated for the ROI. Here, the feature information may include spatial information, such as color, a shape and texture, and temporal information, such as time, speed and direction.

The metadata creation unit 28 generates object metadata capable of maximally fulfilling uniqueness and maximality used to index an object in a video by integrating the information received from the feature information extraction unit 26, and stores the object metadata in a database 40.

The user interface unit 50 provides a graphic user interface (GUI) that enables a user to select only some of search condition input, search result output, video playback and search results. For this purpose, the user interface unit 50 includes a query input unit 52, a search result output unit 54, a video playback unit 56, and a search result filtering unit 58.

The query input unit 52 transfers information about search conditions to the query conversion unit 62 of the video object search unit 60 when the search conditions are input.

The search result output unit 54 provides the search results transferred by the video object search unit 60 according to a determined criterion, such as by similarity, by camera, or by time.

The video playback unit 56 plays back the sections of original videos including the corresponding object using the original videos or single object information selected from the search result list of the search result output unit 54.

The search result filtering unit 58 selects only the thumbnail images of the search result list of the search result output unit 54 or only related objects, determined via the video playback unit 56, in order to generate an evidence video.

The video object search unit 60 provides search results that are acquired by comparing a query input via the user interface unit 50 with the object metadata stored in the database 40. For this purpose, the video object search unit 60 includes a query conversion unit 62, and a database search unit 64.

The query conversion unit 62 converts object search conditions input via the user interface unit 50 into a query that is used to search the database. The query conversion unit 62 transfers the resulting query to the database search unit 64.

The database search unit 64 extracts object information having similar features by similarity by comparing object features corresponding to the search conditions with the object metadata stored in the database 40 based on the input query, and transfers the extracted object information to the search result output unit 54 of the user interface unit 50.

The evidence video generation unit 70 generates a forensic evidence video by collecting only videos, including a specific object, from the search results. For this purpose, the evidence video generation unit 70 includes an evidence video editing unit 72, a forensic evidence video generation unit 74, and a path analysis unit 76.

The evidence video editing unit 72 extracts sections, including a specific object, from the videos of the plurality of surveillance cameras 10 using the information obtained via the search result filtering unit 58, and generates a single evidence video by collecting the sections.

The forensic evidence video generation unit 74 stores camera information, the feature information used for object search, forensic data ensuring the integrity and reliability of video material, and the principal screen image file of each video material, which can be used as forensic evidential material to ensure admissibility of evidence, together with the evidence video, in digital evidence storage format. Here, a technique for generating the forensic data is well known to and readily appreciated by those skilled in the art.

The path analysis unit 76 presents the path of the object by analyzing the information selected by the search result filtering unit 58 of the user interface unit 50. Here, information about the path of the object is provided by the user interface unit 50 in the form of text or a map.

Figure 3:
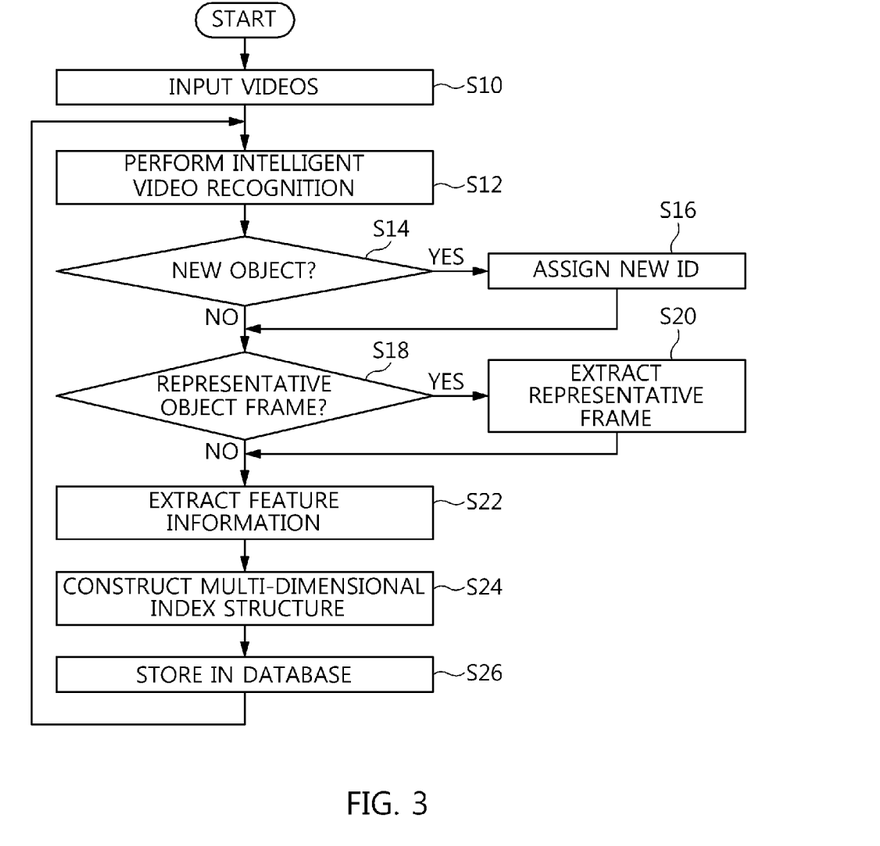
FIG. 3 is a flowchart illustrating a process of indexing a video object in a method of generating evidence video according to an embodiment of the present invention.

FIG. 3 is a flowchart illustrating a process of indexing a video object in a method of generating evidence video according to an embodiment of the present invention.

The video object indexing unit 20 performs the process of indexing a video object in real time using the video data input from the plurality of surveillance cameras 10. The process of indexing a video object may be performed by each of the surveillance cameras 10, along with video recognition technology. Alternatively, the process of indexing a video object may be performed by the video processing server 14 in a separate or integrated manner.

When videos acquired by the plurality of surveillance cameras 10 are input into the video input unit 22 at step S10, the video input unit 22 transfers the received videos to the video analysis unit 24.

The video analysis unit 24 recognizes the appearance of an object in each frame of the received videos via an internal intelligent video recognition module (not illustrated) at step S12.

If the recognized object is a new object (YES at step S14, the video analysis unit 24 assigns a new ID to the new object at step S16. In contrast, if the recognized object is an existing object, the object is continuously tracked based on correlations with previous frames.

Further, the video analysis unit 24 checks whether a frame (that is, a representative object frame) in which an object is most clearly visible is present among a plurality of frames in which the corresponding object is present, by analyzing the object regions of the frames using an internal representative frame extraction module (not illustrated) at step S18. Here, a criterion for selecting a representative object frame may be whether the ratio and number of pixels of an object are close to preset values or are equal to or higher than predetermined reference values, in comparison with previous frames.

If it is determined at step S18 that the frame in which the object is most clearly visible is present among the plurality of frames in which the object is present, the frame is selected for the representative object frame at step S20. The representative object frame may be represented using information including the location of the frame within a video, a captured time, the location of the object within the frame, the size of the object, and a captured image. Thereafter, the representative object frame may be used to extract object feature information, or may be generated and stored in the form of a still image and used as a query image for user input when a search is performed.

After the above-described process of indexing a video object, a process in which the feature information extraction unit 26 extracts feature information from an object region within each frame with respect to each object ID is performed at step S22. The feature information extracted from the object should take into consideration the settings and arrangement of the multiple surveillance cameras in order to analyze the movement of the object among the cameras in a multiple surveillance cameras environment. In the case of a non-overlapping view camera arrangement, color, speed, and direction information may be used as the object extracted information. Meanwhile, in the case of an overlapping view camera arrangement, multi-dimensional feature information, such as an object ID, a shape, texture, and a trajectory, may be additionally used. Furthermore, the object feature extraction may be performed based on a single frame, such as an object appearance time or the representative object frame, or may utilize feature information extracted from a plurality of frames in a range from the time at which an object appears to the time at which the object disappears. In this case, if the object has a plurality of single feature information values in a plurality of frames, the values are replaced with a minimized number of values representative of the object using a classification technique or a histogram. For example, if the feature information is color, the pixel information extracted from a single frame or a plurality of frames may designate several prevailing colors as representative object colors using a histogram.

After the process of extracting feature information, a process in which the metadata creation unit 28 constructs a multi-dimensional index structure is performed at step S24. That is, the metadata creation unit 28 generates object metadata used to index an object in a video by integrating information, including a camera ID, a storage time, the appearing and disappearing times of the object, and a representative image, and the previously extracted multi-dimensional object feature information in order to represent the object.

Thereafter, the metadata creation unit 28 stores the generated object metadata in the database 40 at step S26.

Figure 4:
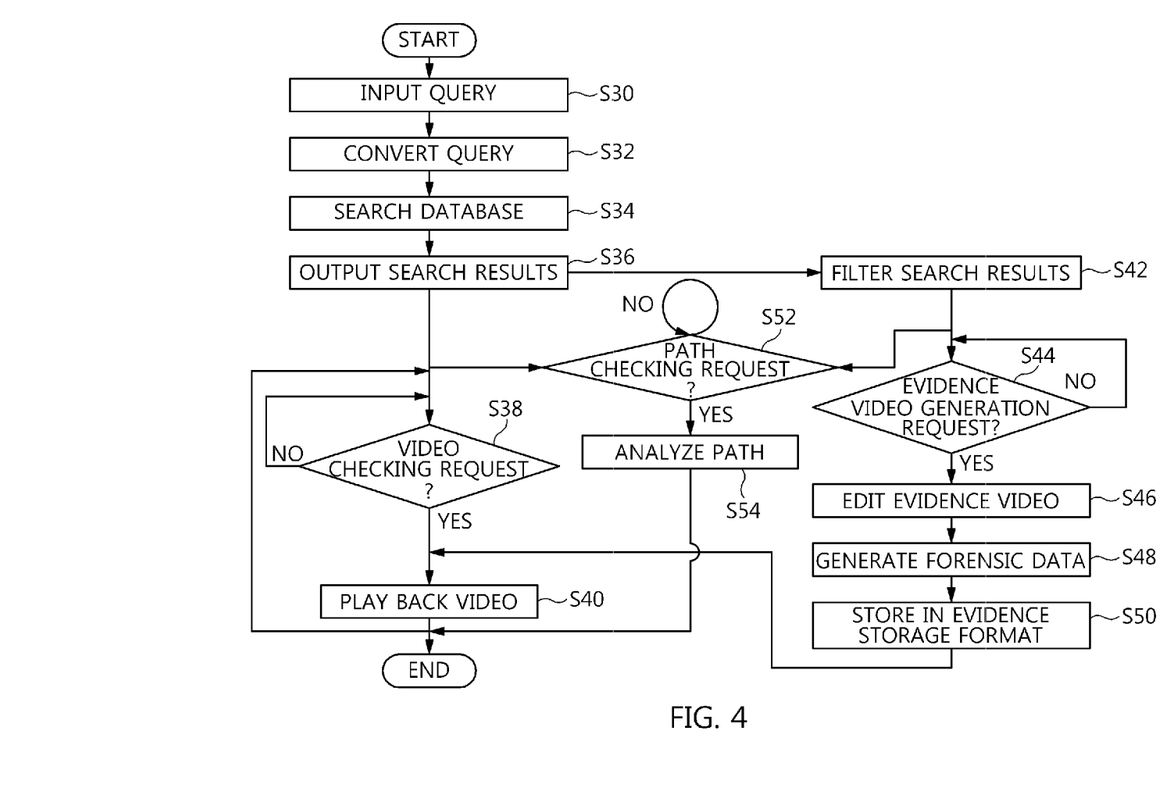
FIG. 4 is a flowchart illustrating a process of searching for an object and generating an evidence video in the method of generating evidence video according to the embodiment of the present invention.

Now, a process of searching for a video object and generating an evidence video in the method of generating evidence video according to the embodiment of the present invention will be described with reference to the flowchart of FIG. 4.

First, a query is input in order to search for an object at step S30. The query input unit 52 of the user interface unit 50 selects a desired date, desired time, and a desired camera that are input by a user, and designates information, including a color, a size, a direction and a trajectory, that is, the feature information of a specific object. Here, the object feature information for the query may include an image or a hand-drawn picture, in addition to direct text information. Meanwhile, the query input unit 52 of the user interface unit 50 may further include a video analysis function in order to extract a feature value.

Information about the query input as described above is transferred to the query conversion unit 62 of the video object search unit 60. The query conversion unit 62 converts the query information into a query that is used to search the database 40 at step S32.

Thereafter, database search unit 64 extracts object information having similar features by comparing conditions input by a user with object metadata stored in the database 40 using the generated query at step S34, and transfers results (e.g., a search result list) to the search result output unit 54 of the user interface unit 50 at step S36. Here, the search result list may be provided based on text or images, other than videos. The images may be images generated and stored by the representative image extractor (not illustrated) of the video object indexing unit 20, thumbnail images generated using the object information of search results, or the like.

Thereafter, the video playback unit 56 checks whether there is a video checking request for the actual movement of the object in the plurality of search results at step S38.

If a user selects one from the search result list (YES at step S38), the video playback unit 56 plays back and shows only sections that include the object video and belong to videos stored in the archive 30, based on the selected search result information at step S40.

Meanwhile, the user checks the objects of the search result list through the repeated use of the video playback unit 56, and selects only a related object using the search result filtering unit 58 at step S42. By such selection, a evidence video generation request for the corresponding object is made at step S44.

In response to the occurrence of the evidence video generation request, the evidence video generation unit 70 generates a single evidence video file encoded in conformity with, for example, the H.264 standard, by extracting sections, including the corresponding object, from the videos stored in the video archive 30 using the evidence video editing unit 72 and then bringing together the sections at step S46. The generated evidence video file is transferred to the forensic evidence video generation unit 74.

The forensic evidence video generation unit 74 generates original video forensic data and evidence video forensic data available for forensic evidential material in order to ensure the forensic admissibility of evidence of evidence videos that are generated in the form of panoramic videos at step S48. Here, the original video forensic data may include information about a system, a network, a video recording time, and still images of an original video, that is, basic information about a camera that have collected video sources. The evidence video forensic data may include an original video forensic data list, system and network information related to a system in which an evidence video has been generated, and data (a hash value) verifying the integrity of the generated evidence video file.

Thereafter, the forensic evidence video generation unit 74 functions to store the generated evidence video and forensic data together in digital evidence storage format at step S50. For example, the digital evidence storage format includes forensic data in XML format, still images of an original video, and an evidence video file. Each of these components of the digital evidence storage format is stored in compression file format.

Furthermore, the generated evidence video file may be checked via the video playback unit 56 of the user interface unit 50.

The user interface unit 50 provides the path of the object through the analysis of video object search results or filtered search results. When a user makes a request for the path of the object via the user interface unit 50, the results of the analysis of the path of the object are displayed in time order using a map on which environments and locations in and at which the plurality of surveillance cameras 10 has been installed are indicated.

The present invention has the advantages of providing efficient object searches by extracting robust object features in various surveillance camera installation environments and then indexing and searching for objects within videos, providing the path of a specific object by analyzing search results, and generating an evidence video used as forensic evidential material by collecting only videos including only a specific object.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A video processing server, comprising:
    a video object indexing unit configured to recognize an object by storing and analyzing videos received from multiple surveillance cameras, to extract features of the recognized object, and then to generate object metadata;
    a video object search unit configured to compare received search conditions with the object metadata, and then to output search results, including feature information of at least one object, which corresponds to the search conditions; and
    an evidence video generation unit configured to generate an evidence video by aggregating only videos including a specific object selected from the search results,
    wherein the evidence video generation unit comprises:
    an evidence video editing unit configured to generate the evidence video by extracting sections, including the specific object, from the stored videos and then aggregating the sections;
    a forensic evidence video generation unit configured to generate forensic data about the stored videos and the generated evidence video, and then to store the generated evidence video and the forensic data in digital evidence storage format; and
    a path analysis unit configured to acquire a path of the specific object among the multiple surveillance cameras by analyzing correlations between the search results, and then to output the path of the specific object.

2. The video processing server of claim 1, wherein the video object indexing unit comprises:
    a video input unit configured to receive the videos from the multiple surveillance cameras;
    a video analysis unit configured to recognize the object in each frame of the videos, and to designate a region of interest (ROI);

a feature information extraction unit configured to extract feature information from the object for which the ROI has been designated; and a metadata creation unit configured to generate the object metadata used to index the object in the videos based on the extracted feature information of the object.

3. The video processing server of claim 2, wherein the video analysis unit selects a representative object frame from among frames of the videos in accordance with a preset criterion for selecting a representative object frame in order to extract the feature information of the object or to select a representative object frame that is used as a query image.

4. The video processing server of claim 1, wherein the feature information of the at least one object comprises extracted object information for a non-overlapping view camera arrangement, including an object color, a moving speed and a moving direction, and additional information for an overlapping view camera arrangement, including an object ID, a shape, texture, and a trajectory.

5. The video processing server of claim 1, wherein the video object search unit comprises:

a query conversion unit configured to convert the received search conditions into a query; and a database search unit configured to extract object information, including similar features, by comparing object features corresponding to the search conditions converted into the query with the object metadata stored in a database, and then to output the extracted object information.

6. The video processing server of claim 1, wherein the path analysis unit displays the path of the specific object in time order using a map on which environments and locations in and on which the multiple surveillance cameras have been installed.

7. The video processing server of claim 1, wherein the forensic data about the stored videos comprises a video recording time in each camera from which video sources have been collected and still images of the original videos.

8. The video processing server of claim 1, wherein the forensic data about the generated evidence video comprises a forensic data list for the stored videos, information about a system and a network where the evidence video is generated, and data which verifies integrity of the generated evidence video.

9. The video processing server of claim 1, wherein the digital evidence storage format comprises forensic data in EXtensible Markup Language (XML) format, still images of original videos, and an evidence video file.

10. The video processing server of claim 1, further comprising a user interface unit configured to allow the search conditions to be input into the video object search unit, to receive the search results from the video object search unit and output the search results, and to play back the evidence video received from the evidence video generation unit.

11. The video processing server of claim 10, wherein the user interface unit comprises:

a query input unit configured to allow the search conditions to be input into the video object search unit;

a search result output unit configured to output the search results received from the video object search unit;

a video playback unit configured to play back the evidence video received from the evidence video generation unit and a video corresponding to object information from among the search results received from the search result output unit; and a search result filtering unit configured to select an object related to the generation of the evidence video from the search results received from the search result output unit.

12. An apparatus for generating evidence video, comprising:

a plurality of surveillance cameras;

a video processing server, comprising a video object indexing unit configured to recognize an object by storing and analyzing videos received from the plurality of surveillance cameras, to extract features of the recognized object, and then to generate object metadata, a video object search unit configured to compare received search conditions with the object metadata, and then to output search results, including feature information of at least one object, which corresponds to the search conditions, and an evidence video generation unit configured to generate an evidence video by aggregating only videos including a specific object selected from the search results; and a video monitoring server comprising a user interface unit configured to allow the search conditions to be input, to allow the search results to be checked, and to allow generation of the evidence video to be requested, wherein the evidence video generation unit comprises:

an evidence video editing unit configured to generate the evidence video by extracting sections, including the specific object, from the stored videos and then aggregating the sections;

a forensic evidence video generation unit configured to generate forensic data about the stored videos and the generated evidence video, and then to store the generated evidence video and the forensic data in digital evidence storage format; and a path analysis unit configured to acquire a path of the specific object among the multiple surveillance cameras by analyzing correlations between the search results, and then to output the path of the specific object.

13. A method of generating evidence video, comprising:

recognizing, by a video object indexing unit, an object by storing and analyzing videos received from multiple surveillance cameras;

extracting, by the video object indexing unit, features of the recognized object, and then generating, by the video object indexing unit, object metadata;

comparing, by a video object search unit, received search conditions with the object metadata, and then outputting, by the video object search unit, search results, including feature information of at least one object, which corresponds to the search conditions; and generating, by an evidence video generation unit, an evidence video by aggregating only videos including a specific object selected from the search results, wherein generating the evidence video comprises:

generating the evidence video by extracting sections, including the specific object, from the stored videos and then aggregating the sections;

generating forensic data about the stored videos and the generated evidence video, and storing the generated evidence video and the forensic data in digital evidence storage format; and acquiring a path of the specific object among the multiple surveillance cameras by analyzing correlations between the search results, and then outputting the path of the specific object.

14. The method of claim 13, wherein generating the object metadata comprises:
designating a region of interest (ROI) in each frame of the videos based on the recognized object;
extracting feature information from the object for which the ROI has been designated; and
generating the object metadata used to index the object in the videos based on the extracted feature information of the object.

15. The method of claim 13, wherein the feature information of the at least one object comprises extracted object information for a non-overlapping view camera arrangement, including an object color, a moving speed and a moving direction, and additional information for an overlapping view camera arrangement, including an object ID, a shape, texture, and a trajectory.

16. The method of claim 13, wherein outputting the search results comprises:
converting the received search conditions into a query; and
extracting object information, including similar features, by comparing object features corresponding to the search conditions converted into the query with the object metadata stored in a database, and then outputting the extracted object information.

17. The method of claim 13, wherein outputting the path of the specific object includes displaying the path of the specific object in time order using a map on which environments and locations in and on which the multiple surveillance cameras have been installed.

18. The method of claim 13, further comprising:
allowing, by a user interface unit, the search conditions to be input;
receiving, by the user interface unit, the search results, and outputting, by the user interface unit, the search results; and
playing back, by the user interface unit, the evidence video.

* * * * *